United States Patent
Zhu (10) Patent No.: US 11,277,069 B2
(45) Date of Patent: Mar. 15, 2022

(54) FREQUENCY CONTROLLER

(71) Applicant: Hypower Microelectronics (Wuxi) Co., Ltd., Shanghai (CN)

(72) Inventor: Ning Zhu, Shanghai (CN)

(73) Assignee: HYPOWER MICROELECTRONICS (WUXI) CO., LTD., Wuxi (CN)

( * ) Notice: Subject to any disclaimer, the term of this patent is extended or adjusted under 35 U.S.C. 154(b) by 0 days.

(21) Appl. No.: 16/857,162

(22) Filed: Apr. 23, 2020

(65) Prior Publication Data
US 2021/0305901 A1 Sep. 30, 2021

(30) Foreign Application Priority Data
Mar. 30, 2020 (CN) .......................... 202010239000.2

(51) Int. Cl.
*H02M 3/335* (2006.01)
*H02M 1/08* (2006.01)
*H02M 1/36* (2007.01)

(52) U.S. Cl.
CPC ......... *H02M 3/33523* (2013.01); *H02M 1/08* (2013.01); *H02M 1/36* (2013.01)

(58) Field of Classification Search
None
See application file for complete search history.

(56) References Cited

U.S. PATENT DOCUMENTS

| | | | | |
|---|---|---|---|---|
| 5,977,530 A * | 11/1999 | Bessho | ............ | H02M 3/33569 219/715 |
| 7,157,943 B2 | 1/2007 | Sanzo | | |
| 7,843,178 B1 * | 11/2010 | Houk | ............ | H02M 3/156 323/222 |
| 2009/0278466 A1* | 11/2009 | Wang | ............ | H05B 41/3925 315/219 |
| 2016/0322908 A1* | 11/2016 | Chen | ............ | H02M 1/15 |
| 2017/0126140 A1* | 5/2017 | Yu | ............ | H02M 1/36 |
| 2017/0250607 A1 | 8/2017 | Zhak et al. | | |
| 2018/0123581 A1* | 5/2018 | Chiu | ............ | H03K 17/166 |

FOREIGN PATENT DOCUMENTS

| | | |
|---|---|---|
| CN | 102594154 A | 7/2012 |
| CN | 103780097 A | 5/2014 |
| CN | 103973092 A | 8/2014 |
| CN | 109802557 A | 5/2019 |
| JP | 0583930 A | 4/1993 |
| JP | 2017163773 A * | 9/2017 |

* cited by examiner

*Primary Examiner* — Jeffrey A Gblende
(74) *Attorney, Agent, or Firm* — Fideli Law PLLC (57) ABSTRACT

A frequency controller for operating a switching power converter is provided. The frequency controller includes an output circuit, an operation signal generator, and a transition signal generator. The output circuit is to connect to a switching power converter. The startup signal generator is connected to the output circuit via a first connection line and configured to generate a startup signal with a startup-frequency during a startup period of the switching power converter. The operation signal generator is connected to the output circuit via a second connection line and configured to generate an operation signal with an operation-frequency during an operation period of the switching power converter. The transition signal generator is connected to the output circuit via a third connection line and configured to generate a transition signal with varied frequencies during a transition period between the startup period and the operation period.

19 Claims, 3 Drawing Sheets

FREQUENCY CONTROLLER

RELATED APPLICATION

The present application claims the benefit of priority to the Chinese patent application No. 202010239000.2, filed on Mar. 30, 2020, and entitled "Frequency Controller", the entire contents of the Chinese patent application is incorporated herein by reference.

BACKGROUND

Technical Field

The present disclosure relates to the technical field of the integrated circuit, more particularly, to a frequency controller for operating a switching power converter.

Background Information

Among various types of power converters, switching power converters are widely used because they have better efficiency and provide suitable output modulation. Generally, the switching power converter needs to be powerful enough to charge up the output voltage within a certain time limit. However, the faster the output voltage is charged, the higher electrical stress the switching power converter will experience. Some current frequency controllers still use a startup frequency scheme that is the same or substantially similar to the normal operation scheme, which is unable to provide sophisticated control during startup and normal operation of the switching power converter. In fact, how to balance between the startup electrical stress and the startup speed is a problem that has long plagued the switching power converter industry. The above-mentioned problem of the switching power converter is just an epitome of a wide variety of power converter products.

Therefore, there is a need to have a frequency controller to achieve a good balance between the startup speed and the startup electrical stress of the switching power converter.

SUMMARY

To avoids the high frequency during startup, as well as allow enough frequency to speed up the output voltage ramping, the present disclosure provides a frequency controller for operating a switching power converter, which applies a multi-stage frequency control scheme to soft-start of the switching power converter, such that the electrical stress and the startup speed and output ramping performance are optimized.

During the startup stage, the startup frequency is applied to speed up the startup and limit the audible noise. During the operation stage, the operation-frequency is applied to ensure the normal operation of the switching power converter. During the transition stage between the startup stage and the operation stage, discretely varied frequencies are applied to provide a more sophisticated control for output ramping.

One aspect of the present disclosure provides a frequency controller for operating a switching power converter. The frequency controller includes: an output circuit to connect to the switching power converter; a startup signal generator connected to the output circuit via a first connection line and configured to generate a startup signal with a startup-frequency during a startup period of the switching power converter; an operation signal generator connected to the output circuit via a second connection line and configured to generate an operation signal with an operation-frequency during an operation period of the switching power converter; and a transition signal generator connected to the output circuit via a third connection line and configured to generate a transition signal with varied frequencies during a transition period between the startup period and the operation period.

In some embodiments of the present disclosure, frequencies of the transition signal may vary discretely with respect to time.

In some embodiments of the present disclosure, frequencies of the transition signal may increase monotonously with respect to time.

In some embodiments of the present disclosure, frequencies of the transition signal vary continuously with respect to time.

In some embodiments of the present disclosure, the transition signal generator may include: a first frequency generator configured to generate a first automated pulse signal at a first frequency for a first period of time of the transition period, and a second frequency generator configured to generate a second automated pulse signal at a second frequency for the remainder of the transition period.

In some embodiments of the present disclosure, the frequency controller may further include a switch circuit connected to the startup signal generator, the operation signal generator, and the transitional signal generator and configured to: control the startup signal generator to send the startup signal to the output circuit during the startup period; control the operation signal generator to send the operation signal to the output circuit during the operation period; and control the transition signal generator to send the transition signal to the output circuit during the transition period.

In some embodiments of the present disclosure, the switch circuit may include a first switch connecting the startup signal generator and the output circuit; a second switch connecting the operation signal generator and the output circuit; and at least one timer: connecting to the first switch and controlling an operation status of the first switch, and connecting to the second switch and controlling an operation status of the second switch.

In some embodiments of the present disclosure, the at least one timer may include a first timer connecting to the first switch and the second switch, and wherein when the first timer expires, the first switch may be turned off and the second switch may be turned on.

In some embodiments of the present disclosure, the switch circuit may further include: a third switch connecting the first frequency generator and the output circuit; and a fourth switch connecting the second frequency generator and the output circuit, and wherein the at least one timer may further include a second timer connecting to the third switch and the fourth switch, when the second timer expires, the third switch may be turned off and the fourth switch may be turned on.

In some embodiments of the present disclosure, the startup signal generator may start to generate the startup signal after the frequency controller is powered on for a predetermined time.

In some embodiments of the present disclosure, the frequency controller may further include a status detection pin to receive a feedback voltage that is proportional to a voltage of a secondary winding of the switching power converter.

In some embodiments of the present disclosure, the operation signal generator may be connected to the status detection pin and configured to receive the feedback voltage and generates the operation signal upon detection of a valley in a resonant ringing of the feedback voltage.

In some embodiments of the present disclosure, the transition signal generator may be configured to generate the transition signal if the operation signal generator fails to detect a valley in the resonant ringing of the feedback voltage.

In some embodiments of the present disclosure, the frequency controller may further include: a clamping signal generator connected to the output circuit via a fourth connection line and configured to generate a clamping signal with a clamping-frequency.

In some embodiments of the present disclosure, the frequency controller may further include a maximum frequency pin to connect a resistor and the clamping signal generator to control the clamping-frequency.

In some embodiments of the present disclosure, the output circuit may include: a signal selector connected to the startup signal generator, the operation signal generator and the clamping signal generator and configured to selectively output one of the startup signal, the operation signal, and the clamping signal.

In some embodiments of the present disclosure, the signal selector may be configured to output the clamping signal only if the startup-frequency or the operation-frequency is greater than the clamping-frequency.

In some embodiments of the present disclosure, the output circuit may include: a signal modulator connected to the signal selector and the transition signal generator and configured to modulate a signal output by the signal selector or the transition signal generator.

In some embodiments of the present disclosure, the startup-frequency may be 22 kHz to 28 kHz, the frequency of the transition signal may vary from 10 kHz to ⅙ MHz, the clamping-frequency may be 30 kHz to 500 kHz.

In some embodiments of the present disclosure, an expiration time of the first timer may be ⅛ to ½ of the expiration time of the second timer.

With the frequency controller, multi-stage frequency control is available, which shortens the time of the soft startup, limits the audible noise and electrical stress, and optimize the entire output ramping performance.

BRIEF DESCRIPTION OF THE DRAWINGS

The present disclosure is further described in terms of exemplary embodiments. The foregoing and other aspects of embodiments of the present disclosure are made more evident in the following detail description when read in conjunction with the attached drawing figures.

DETAILED DESCRIPTION

The present disclosure provides a frequency controller that applies a multi-stage frequency control scheme to soft-start a switching power converter to optimize the electrical stress, the startup speed, and output ramping performance.

The terminology used herein is to describe particular exemplary embodiments only and is not intended to be limiting. As used herein, the singular forms "a," "an," and "the" may include their plural forms as well, unless the context indicates otherwise. When used in this disclosure, the terms "comprises," "comprising," "includes," and/or "including" refer to the presence of stated features, integers, steps, operations, elements, components and/or groups, but do not preclude the presence or addition of one or more other features, integers, steps, operations, elements, components, and/or groups. Terms that express relative positions between different elements, such as "on," "connected to," "under," should be construed to include both direct and indirect relations. For example, "A is connected to B" should be construed to include situations of both A is directly connected to B and A is indirectly connected to B.

In view of the following description, these and other features of the present disclosure, as well as operations and functions of related elements of the structure, and the economic efficiency of the combination and manufacture of the components, may be significantly improved. All of these form part of the present disclosure with reference to the drawings. However, it should be clearly understood that the drawings are only for the purpose of illustration and description, and are not intended to limit the scope of the present disclosure.

Figure 1:
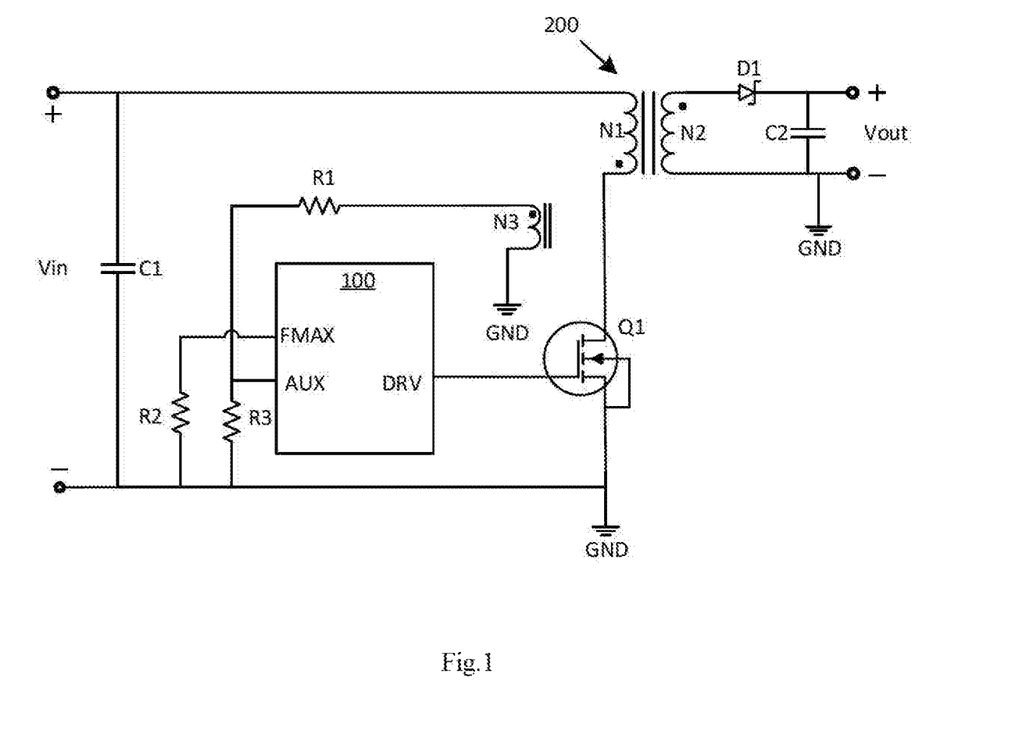
FIG. 1 is a circuit diagram of a frequency controller according to some embodiments of the present disclosure and a switching power converter.

FIG. 1 is a circuit diagram of a frequency controller 100 connecting to a switching power converter 200 according to some embodiments of the present disclosure.

The switching power converter 200 may be a flyback converter, a boost converter, or any other devices or circuits that need a soft startup. The switching power converter 200 may be a part of any integrated circuits or non-integrated circuits. The switching power converter 200 may include a switching element the operation status (e.g., on and off) of which can be controlled by an input signal. The switching element may be a MOSFET (Metal-Oxide-Semiconductor Field Effect Transistor), BJT (Bipolar Junction Transistor), SCR (Silicon Controlled Rectifier). GTO (Gate Turn-Off Thyristor), IGBT (Insulated Gate Bipolar Translator), MCT (MOS-Controlled Thyristor), or SIT (Static Induction Transistor). Merely for illustration purposes, a flyback converter is taken as an example to illustrate the switching power converter 200 in the present disclosure. As shown in FIG. 1, the flyback converter is a power supply that takes advantage of mutually coupled inductors (i.e., transformer) to store energy when current passes therethrough and releasing the energy when the power on the primary side of the transformer is turned off.

As shown in FIG. 1, the switching power converter 200 may include an input capacitor C1, a primary winding N1, a secondary winding N2 coupled with the primary winding N1, a MOSFET Q1, a diode D1, and an output capacitor C2.

In particular, an input voltage Vin is applied across the input capacitor C1. A first end of the input capacitor C1 is connected to a first end of the primary winding N1, and a second end of the input capacitor C1 is connected to the ground GND. A second end of the primary winding N1 is connected to the drain of the MOSFET Q1. The source of the MOSFET Q1 is connected to the ground GND. A first end of the secondary winding N2 is connected to a positive end of the diode D1, and the second end of the secondary winding N2 is connected to the ground GND. A first end of the output capacitor C2 is connected to the negative end of the diode D1, and the second end of the output capacitor C2 is connected to the ground GND.

When the MOSFET Q1 is turned on, the input voltage Vin is directly applied to the primary winding N1, causing the increase of a current and magnetic flux on the primary side of the switching power converter 200. As a result, energy is stored in the primary side. At this stage, the voltage induced to the secondary winding N2 is negative, so the diode D1 is reverse-biased (i.e., blocked), and the output capacitor C2 supplies output voltage Vout.

When the MOSFET Q1 is turned off, the current and the magnetic flux on the primary side drops, and the voltage across the secondary winding N2 becomes positive, forward-biasing the diode D1, allowing current to flow on the secondary side of the switching power converter 200. At this stage, the energy stored on the primary side is delivered to the secondary side, and the diode D1 rectifies the current to produce a DC output.

The frequency controller 100 may be connected to the switching power converter 200 through a peripheral circuit. To control the operation status of the switching power converter 200, the frequency controller 100 is configured and/or designed to generate signals (e.g., pulse signals) to control the switching of operation status of the MOSFET Q1.

In particular, the frequency controller 100 includes a status detection pin AUX and driving signal output pin DRV. The status detection pin AUX is connected to an auxiliary winding N3 through two resistors R1 and R2 connected in series. The auxiliary winding N3 is coupled with the primary winding N1 and has fewer turns than that of the secondary winding N2, which means the voltage across the auxiliary winding N3 is synchronized with and proportional with the voltage across the secondary winding N2. The driving signal output pin DRV is connected to a gate of the MOSFET Q1 and configured to output pulses for switching on/off the MOSFET Q1. The frequency controller 100 may further include a maximum frequency pin FMAX, which may be connected to the ground GND through a controlling circuit to control a maximum frequency of the frequency controller 100. For example, the controlling circuit may be a resistor R2. The resistor R2 may be a variable or adjustable resistor.

Figure 2:
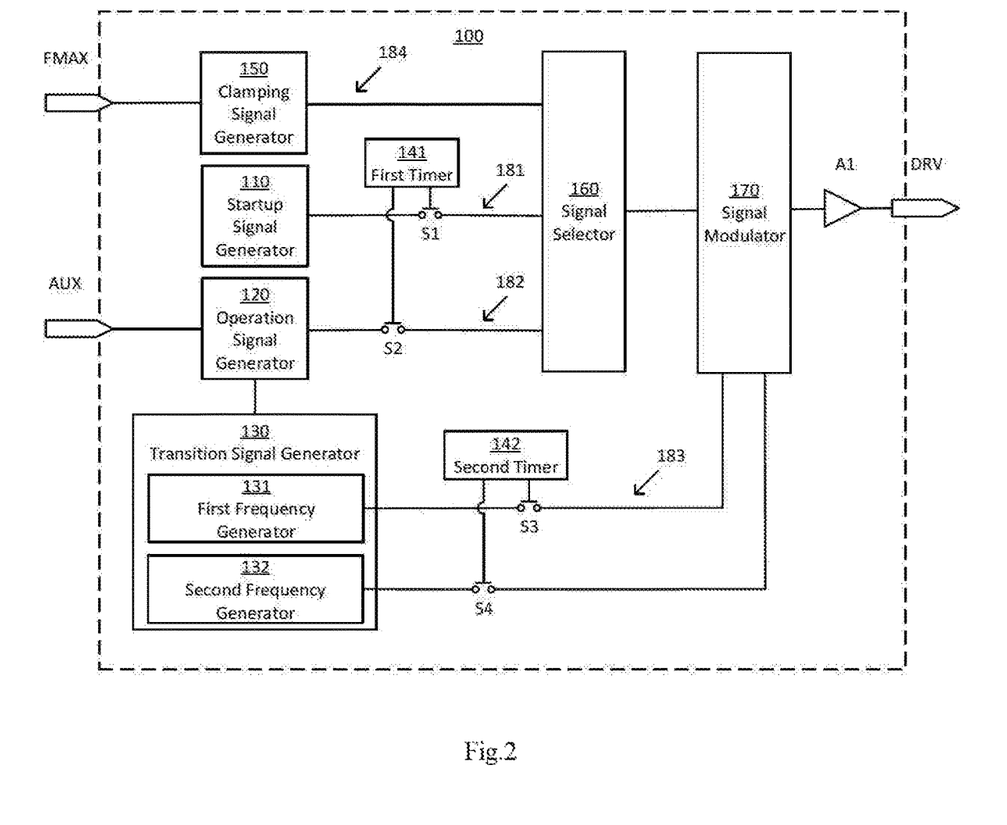
FIG. 2 is a schematic view of the structure of a frequency controller according to some embodiments of the present disclosure.

FIG. 2 is a schematic view of the structure of the frequency controller 100 according to some embodiments of the present disclosure.

The frequency controller 100 includes a startup signal generator 110, an operation signal generator 120, a transition signal generator 130, a clamping signal generator 150, a switch circuit (e.g., including a first switch S1, a second switch S2, a third switch S3, a fourth switch S4, and at least one timer (e.g., including a first timer 141 and a second timer 142)), an output circuit (e.g., including a signal selector 160, a signal modulator 170, and an amplifier A1), the maximum frequency pin FMAX, the status detection pin AUX, and the driving signal output pin DRV.

The status detection pin AUX may be configured to receive a feedback voltage from the auxiliary winding N3 (see FIG. 1) that is proportional to a voltage across the secondary winding N2 of the switching power converter 200 (see FIG. 1).

The maximum frequency pin FMAX may be configured to connect to the clamping signal generator 150 to control a clamping-frequency of a clamping signal generated by the clamping signal generator 150.

The startup signal generator 110 may be directly or indirectly connected to the output circuit (e.g., the signal selector 160) via a first connection line 181. The startup signal generator 110 may be configured to generate a startup signal with a startup-frequency during a startup period of the switching power converter 200 (see FIG. 1). In some embodiments, the startup-frequency may be between 22 kHz and 28 kHz. For example, the startup-frequency may be [22 kHz, 23 kHz), 123 kHz, 24 kHz), [24 kHz, 25 kHz), [25 kHz, 26 kHz), [26 kHz, 27 kHz), or [27 kHz, 28 kHz). By way of illustration, the present disclosure takes 25 kHz as an example of the startup-frequency. The first pulse of the startup signal may be generated after the frequency controller 100 is powered on for a predetermined time period (e.g., 100 μs). The startup period may be a portion of the expiration time (e.g., 4 ms) of a second timer 142 (also called soft-start timer and will be described in detail hereinafter). For example, the startup period may be ⅕ to ½ of the expiration time of the second timer 142. For example, the startup period may be ⅕ to ¼ of the expiration time of the second timer 142. For example, the startup period may be ⅑ to ⅛ of the expiration time of the second timer 142. For example, the second timer 142 may expire after 4 ms. For example, the startup period may be [400 μs, 420 μs), [420 μs, 444 μs), [444 μs, 480 μs), [480 pts, 500 μs), [500 μs, 520 μs), [520 μs, 600 μs), [600 μs, 700 μs), [700 μs, 800 μs), [800 μs, 900 μs), [900 μs, 1 ms), or [1 ms, 2 ms). Using the startup signal with the startup-frequency may limit the audible noise and shorten the soft-start time of the switching power converter 200.

The operation signal generator 120 may be directly or indirectly connected to the output circuit (e.g., the signal selector 160) via a second connection line 182. The operation signal generator 120 may be configured to generate an operation signal with an operation-frequency during an operation period of the switching power converter 200 (see FIG. 1). The operation signal generator 120 may be directly or indirectly connected to the status detection pin AUX and configured to receive the feedback voltage from the auxiliary winding N3 (see FIG. 1) and generates the operation signal upon detection of a predetermined number of valley (s) in a resonant ringing of the feedback voltage, wherein the predetermined number may be any integer between 1 to 10. In the present disclosure, the term "valley" means a situation or event where the feedback voltage (e.g., from the auxiliary winding N3, the secondary winding N2, or the drain of the MOSFET Q1) falls below a demagnetization threshold. The demagnetization threshold may be 0 mV to 60 mV, for example, 55 mV. The operation signal generator 120 may be configured to determine whether the feedback voltage is at the valley for example, by comparing the feedback voltage with the demagnetization threshold. Turning the MOSFET Q1 on to start the next switching cycle when the feedback voltage falls below a demagnetization threshold may minimize switching losses. The on/off time of the operation signal may vary according to the feedback voltage. The operation signal generator 120 may be configured to receive a feedback voltage from the secondary winding N2 (see FIG. 1) and generates the operation signal upon detection of a predetermined number of valley(s) in a resonant ringing of the feedback voltage, wherein the predetermined number may be any integer between 1 to 10. The operation signal generator 120 may be configured to receive a feedback voltage from the drain of the MOSFET Q1 (see FIG. 1) and generates the operation signal upon detection of a predetermined number of valley(s) in a resonant ringing of the feedback voltage, wherein the predetermined number may be any integer between 1 to 10.

The operation signal generator 120 may further include a signal comparator (not shown) connected to the status detection pin AUX and a signal generator (not shown) connected to the signal comparator. The signal comparator may be configured to receive and compare the feedback voltage with a threshold (e.g., 0 mV to 60 mV). The signal generator may be configured to generate the operation signal once the signal comparator determines that the feedback voltage falls lower than the threshold.

The transition signal generator 130 may be directly or indirectly connected to the output circuit (e.g., the signal modulator 170) via a third connection line 183. The transition signal generator 130 may be configured to generate a transition signal with varied frequencies during a transition period between the startup period and the operation period. The frequencies of the transition signal may vary discretely with respect to time, i.e., the transition signal generator 130 may sequentially generate a plurality of transition signals at discrete frequencies. For example, the number of the plurality of discrete frequencies may be two or more. Further, the frequencies of the transition signal may vary monotonously with respect to time, i.e., the plurality of discrete frequencies may be generated as a frequency sequence monotonously starting from a lower frequency to a higher frequency or monotonously stating from a higher frequency to a lower frequency. In the present disclosure, the frequencies of the transition signal may increase monotonously with respect to time. To this end, the transition signal generator 130 may include a first frequency generator 131 and a second frequency generator 132. The first frequency generator 131 may be configured to generate a first automated pulse signal at a first frequency (e.g., 10 kHz) for a first period of time of the transition period, e.g., before the second timer 142 expires. The second frequency generator 132 may be configured to generate a second automated pulse signal at a second frequency (e.g., ⅙ MHz) for the remainder of the transition period, e.g., after the second timer 142 expires. For example, the first frequency may be 15 kHz, and the second frequency may be 150 kHz. The transition signal generator 130 may be directly or indirectly connected to the operation signal generator 120 or the signal comparator. The first frequency generator 131 and/or the second frequency generator 132 may be directly or indirectly connected to the operation signal generator 120 or the signal comparator. The transition signal generator 130 may be configured to generate the transition signal if the operation signal generator 120 or the signal comparator fails to detect a predetermined number of valley(s) in the resonant ringing of the feedback voltage, wherein the predetermined number may be any integer between 1 to 10. For example, if there is no signal input to the status detection pin AUX, the transition signal generator 130 generates the transition signal. In the present disclosure, the frequencies of the transition signal may vary continuously with respect to time. To this end, the transition signal generator 130 may include a frequency generator (not shown) that may be configured to generate an automated pulse signal at a variable frequency from 10 kHz to ⅙ MHz for a period of time of the transition period. The transition signal may be used to provide a series of minimum sustaining and transitional pulse signals between the startup period and the operation period to prevent the switching power converter 200 from a completely shut-down when undergoing any failure or malfunction.

The clamping signal generator 150 may be directly or indirectly connected to the output circuit (e.g., the signal selector 160) via a fourth connection line 184. The clamping signal generator 150 may be configured to generate a clamping signal with a clamping-frequency. The clamping-frequency may be 30 kHz to 500 kHz, for example, 100 kHz to 300 kHz. For example, clamping-frequency may be 110 kHz. Using a clamping signal with a clamping-frequency may limit the electrical stress on the switching power converter 200. The clamping signal generator 150 may be directly or indirectly connected to the operation signal generator 120 to limit the operation signal generated by the operation signal generator 120 to the clamping-frequency if the operation-frequency exceeds the clamping-frequency.

The output circuit may directly or indirectly connect to the switching power converter 200. The output circuit may include a signal selector 160, a signal modulator 170, and an amplifier A1.

The signal selector 160 may be directly or indirectly connected to the startup signal generator 110, the operation signal generator 120, and the clamping signal generator 150. The signal selector 160 may be configured to selectively output one of the startup signal, the operation signal, and the clamping signal. The signal selector 160 may be configured to output the startup signal when the startup-frequency is less than or equal to the clamping-frequency. The signal selector 160 may be configured to output the operation signal when the operation-frequency is less than or equal to the clamping-frequency. The signal selector 160 may be configured to output the clamping signal when the startup-frequency or the operation-frequency is greater than the clamping-frequency. For example, the signal selector 160 may be configured to output the clamping signal only if the startup-frequency or the operation-frequency is greater than the clamping-frequency. For example, if the startup-frequency of the startup signal generated by the startup signal generator 110 increases to be higher than the clamping-frequency, the output of the signal selector 160 may switch from the startup signal to the clamping signal. Similarly, if the operation-frequency of the operation signal generated by the operation signal generator 120 increases to be higher than the clamping frequency, the output of the signal selector 160 may switch from the operation signal to the clamping signal. By doing so, the electrical stress on the switching power converter 200 may be controlled to a certain degree. The signal selector 160 may include a comparator (not shown) to compare the operation signal or the startup signal with the clamping signal.

The signal modulator 170 may be directly or indirectly connected to the signal selector 160 and the transition signal generator 130 (i.e., the first frequency generator 131 and the second frequency generator 132) and configured to modulate a signal output by the signal selector 160 or the transition signal generator 130. For example, the signal modulator 170 may be a pulse width modulator, which may be configured to reduce the average power delivered by the signal by effectively chopping it up into discrete parts.

The amplifier A1 may be directly or indirectly connected to the signal modulator 170 and configured to amplifier a signal output by the signal modulator 170. An output of the amplifier A1 may be connected to the driving signal output pin DRV.

The switch circuit may include a first switch S1, a second switch S2, a third switch S3, and a fourth switch S4. The switch circuit may be directly or indirectly connected to the startup signal generator 110, the operation signal generator 120, and the transitional signal generator 130. The switch circuit may be configured to control the startup signal generator 110 to send the startup signal to the output circuit during the startup period. The switch circuit may be configured to control the operation signal generator 120 to send the operation signal to the output circuit during the operation period. The switch circuit may be configured to control the transition signal generator 130 to send the transition signal to the output circuit during the transition period.

Specifically, the first switch S1 may be directly or indirectly connect the startup signal generator 110 and the output circuit (e.g., the signal selector 160). The second switch S2 may be directly or indirectly connect the operation signal generator 120 and the output circuit (e.g., the signal selector 160). The third switch S3 may be directly or indirectly connect the first frequency generator 131 and the output circuit (e.g., the signal modulator 170). The fourth switch S4 may be directly or indirectly connect the second frequency generator 132 and the output circuit (e.g., the signal modulator 170).

The at least one timer may include a first timer 141 and a second time 142. The at least one timer may be directly or indirectly connected to the first switch S1 and configured to and control an operation status (i.e., on and off) of the first switch S1. The at least one timer may be directly or indirectly connected to the second switch S2 and configured to control an operation status (i.e., on and off) of the second switch S2. The at least one timer may be directly or indirectly connected to the third switch S3 and configured to control an operation status (i.e., on and oft) of the third switch S3. The at least one timer may be directly or indirectly connected to the fourth switch S4 and configured to control an operation status (i.e., on and off) of the fourth switch S4. The at least one timer may include only one timer to connect to and control the operation status of first switch S1, the second switch S2, the third switch S3, and the fourth switch S4, respectively.

Specifically, the first timer 141 may be directly or indirectly connected to the first switch S1 and the second switch S2. The first switch S1 may be on after the frequency controller 100 is powered up after a predetermined time (e.g., 100 µs) and may be off after the first timer 141 expires. The second switch S2 may be on after the first timer 141 expires. The second timer 142 may be directly or indirectly connected to the third switch S3 and the fourth switch S4. Before the second timer 142 expires, the third switch may be turned on and the fourth switch may be turned off. When the second timer 142 expires, the third switch may be turned off and the fourth switch may be turned on. The second timer 142 may expire after 4 ms. The frequency controller 100 may be used as an offline AC/DC controller or any other power conversion controller.

Figure 3:
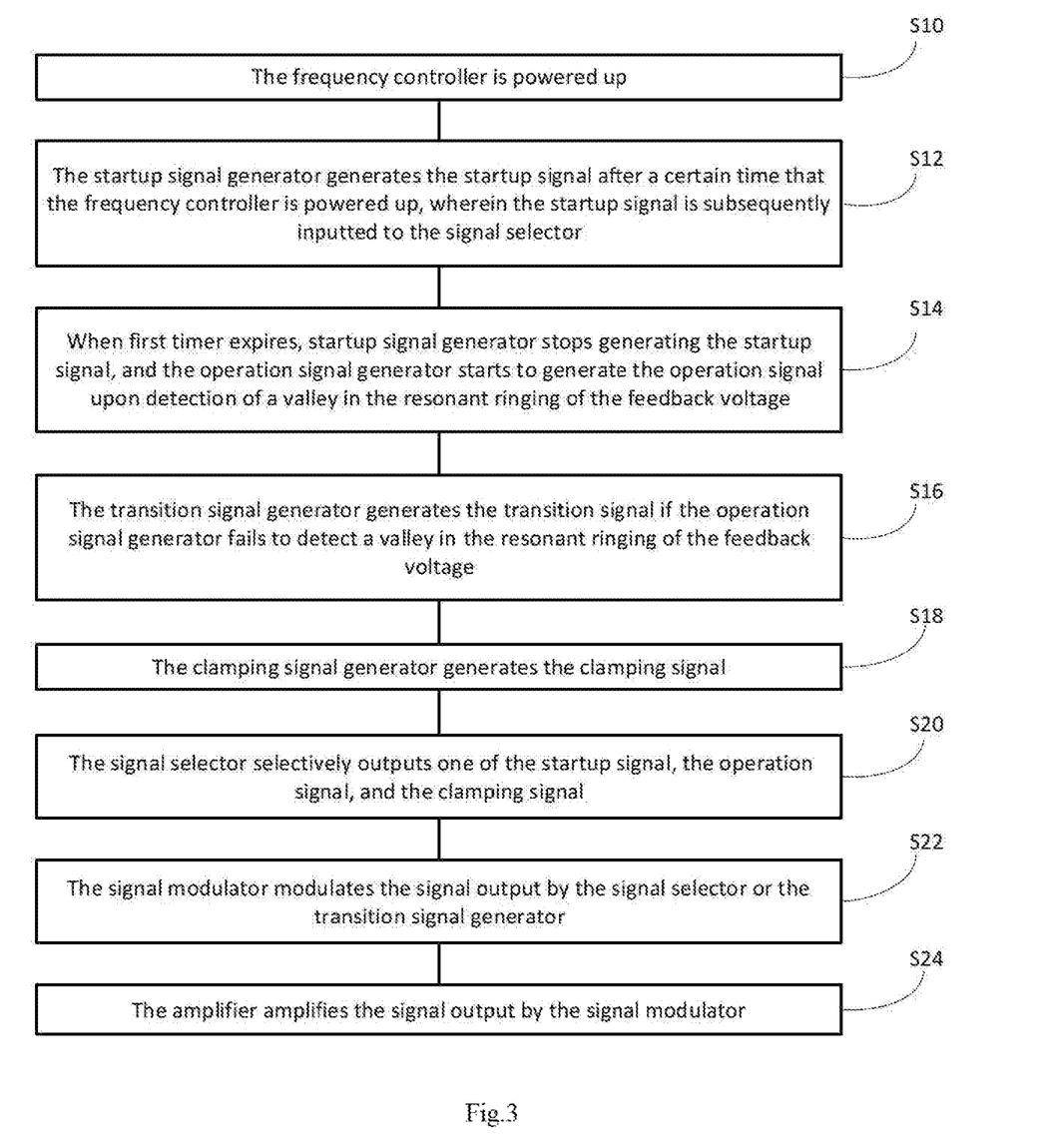
FIG. 3 is a flowchart of the control method used by the frequency controller according to some embodiments of the present disclosure.

FIG. 3 is a flowchart of the control method used by the frequency controller 100 according to some embodiments of the present disclosure.

In step S10, the frequency controller 100 is powered up.

In step S12, the startup signal generator 110 generates the startup signal (e.g., 25 kHz) after a certain time, e.g., 100 µs, that the frequency controller 100 is powered up, wherein the startup signal is subsequently inputted to the signal selector 160. The use of the startup signal may speed up the power ramping of the switching power converter 200 and limit the audible noise. The startup signal may continuously be sent to the signal selector 160 until the first timer 141 expires.

In step S14, when the first timer 141 (e.g., 500 µs) expires, the first switch S1 is turned off such that the startup signal generator 110 stops sending the startup signal to the signal selector 160, and the second switch S2 is turned on such that the operation signal generator 120 starts to generate the operation signal upon detection of a predetermined number of valley(s) in the resonant ringing of the feedback voltage. The operation signal may be subsequently inputted to the signal selector 160 and may vary according to the change of the feedback voltage.

In step S16, the transition signal generator 130 generates the transition signal if the operation signal generator 120 fails to detect a predetermined number of valley(s) in the resonant ringing of the feedback voltage. The transition signal may be subsequently inputted to the signal modulator 170. In particular, before the second timer 142 (e.g., 4 ms) expires, the third switch S3 is turn on, and the fourth switch S4 is turn oft, such that the first automated pulse signal (e.g., 10 kHz) generated by the first frequency generator 131 can be transmitted to the signal modulator 170; after the second timer 142 expires, the third switch S3 is turn off, and the fourth switch S4 is turn on, such that the second automated pulse signal (e.g., ⅙ MHz) generated by the second frequency generator 132 can be transmitted to the signal modulator 170.

In step S18, the clamping signal generator 150 generates the clamping signal.

In step S20, the signal selector 160 selectively outputs one of the startup signal, the operation signal, and the clamping signal. In particular, when the startup-frequency of the startup signal or the operation-frequency of the operation signal is greater than the clamping-frequency of the clamping signal, the signal selector 160 outputs the clamping signal; when the startup-frequency is lower than the clamping-frequency, the signal selector 160 outputs the startup signal; when the operation-frequency is lower than the clamping-frequency, the signal selector 160 outputs the operation signal.

In step S22, the signal modulator 170 modulates the signal output by the signal selector 160 or the transition signal generator 130.

In step S24, the amplifier A1 amplifies the signal output by the signal modulator 170. The amplified signal is sent to the driving signal output pin DRV to control the operation status of the MOSFET Q1 (see FIG. 1).

In summary, the present disclosure discloses a frequency controller to soft-start a switching power converter, such as a flyback power converter. The soft-start frequency control disclosed by the present application includes making an output signal with multiple stage frequencies. For example, the frequency controller in the present disclosure provides a 3-stage frequency ramp-up signal to the flyback power converter. This frequency output scheme may help avoid the startup high frequency, as well as allow enough frequency to speed up the output voltage ramping.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. For example, the steps in the methods of the present disclosure may not necessarily be operated altogether under the described order. The steps may also be partially operated, and/or operated under other combinations reasonably expected by one of ordinary skill in the art. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

The invention claimed is:

1. A frequency controller for operating a switching power converter, comprising:
an output circuit to connect to the switching power converter;
a startup signal generator connected to the output circuit via a first connection line, configured to generate a startup signal with a startup-frequency during a startup period of the switching power converter;
an operation signal generator connected to the output circuit via a second connection line, configured to generate an operation signal with an operation-frequency during an operation period of the switching power converter; and
a transition signal generator connected to the output circuit via a third connection line, configured to generate a transition signal with varied frequencies during a transition period between the startup period and the operation period, wherein the transition signal generator includes:
a first frequency generator configured to generate a first automated pulse signal at a first frequency for a first period of time of the transition period; and
a second frequency generator configured to generate a second automated pulse signal at a second frequency for the remainder of the transition period.

2. The frequency controller of claim 1, wherein frequencies of the transition signal vary discretely with respect to time.

3. The frequency controller of claim 1, wherein frequencies of the transition signal increase monotonously with respect to time.

4. The frequency controller of claim 1, wherein frequencies of the transition signal vary continuously with respect to time.

5. The frequency controller of claim 2, further comprising:
a switch circuit connected to the startup signal generator, the operation signal generator, and the transitional signal generator, wherein the switch circuit is configured to:
control the startup signal generator to send the startup signal to the output circuit during the startup period;
control the operation signal generator to send the operation signal to the output circuit during the operation period; and
control the transition signal generator to send the transition signal to the output circuit during the transition period.

6. The frequency controller of claim 5, wherein the switch circuit includes:
a first switch connecting the startup signal generator and the output circuit;
a second switch connecting the operation signal generator and the output circuit; and
at least one timer:
connecting to the first switch and controlling an operation status of the first switch, and
connecting to the second switch and controlling an operation status of the second switch.

7. The frequency controller of claim 6, wherein the at least one timer includes a first timer connecting to the first switch and the second switch, and wherein when the first timer expires, the first switch is turned off and the second switch is turned on.

8. The frequency controller of claim 6, wherein the switch circuit further includes:
a third switch connecting the first frequency generator and the output circuit; and
a fourth switch connecting the second frequency generator and the output circuit, and
wherein the at least one timer further includes a second timer connecting to the third switch and the fourth switch, when the second timer expires, the third switch is turned off and the fourth switch is turned on.

9. The frequency controller of claim 1, wherein the startup signal generator starts to generate the startup signal after the frequency controller is powered on for a predetermined time period.

10. The frequency controller of claim 1, further includes a status detection pin to receive a feedback voltage that is proportional to a voltage of a secondary winding of the switching power converter.

11. The frequency controller of claim 10, wherein the operation signal generator is connected to the status detection pin and configured to receive the feedback voltage and generates the operation signal upon detection of a valley in a resonant ringing of the feedback voltage.

12. The frequency controller of claim 11, wherein the transition signal generator is configured to generate the transition signal if the operation signal generator fails to detect a valley in the resonant ringing of the feedback voltage.

13. The frequency controller of claim 1, further comprising:
a clamping signal generator connected to the output circuit via a fourth connection line and configured to generate a clamping signal with a clamping-frequency.

14. The frequency controller of claim 13, further includes a maximum frequency pin to connect a resistor and the clamping signal generator to control the clamping-frequency.

15. The frequency controller of claim 13, wherein the output circuit includes:
a signal selector connected to the startup signal generator, the operation signal generator, and the clamping signal generator and configured to selectively output one of the startup signal, the operation signal, and the clamping signal.

16. The frequency controller of claim 15, wherein the signal selector is configured to output the clamping signal when the startup-frequency or the operation-frequency is greater than the clamping-frequency.

17. The frequency controller of claim 15, wherein the output circuit includes:
a signal modulator connected to the signal selector and the transition signal generator and configured to modulate a signal output by the signal selector or the transition signal generator.

18. The frequency controller of claim 1, wherein the startup-frequency is 22 kHz to 28 kHz, the frequency of the transition signal varies from 10 kHz to ⅙ MHz, and the clamping-frequency is 30 kHz to 500 kHz.

19. The frequency controller of claim 8, wherein an expiration time of the first timer is ⅕ to ½ of expiration time of the second timer.

* * * * *